United States Patent [19]
Agarwal et al.

[11] Patent Number: 5,173,136
[45] Date of Patent: Dec. 22, 1992

[54] CUT RESISTANT TIRE WITH EMBEDDED OBLONG FIBERS

[75] Inventors: Subhash C. Agarwal, Akron; George H. Fisk, Stow, both of Ohio

[73] Assignee: The Goodyear Tire & Rubber Company, Akron, Ohio

[21] Appl. No.: 600,380

[22] Filed: Oct. 19, 1990

[51] Int. Cl.⁵ .................. B60C 11/00; B60C 1/00
[52] U.S. Cl. .................. 152/209 R; 152/525; 152/565
[58] Field of Search .......... 152/208, 209 R, 458, 152/525, 555, 564, 565

[56] References Cited

U.S. PATENT DOCUMENTS

| | | |
|---|---|---|
| 2,960,139 | 11/1960 | Engstrom et al. |
| 3,052,274 | 9/1962 | Lang |
| 3,077,915 | 2/1963 | Weber |
| 3,095,027 | 6/1963 | Weber |
| 3,682,221 | 8/1972 | Marzocchi et al. ......... 152/458 |
| 3,746,669 | 7/1973 | Dunnom |
| 3,945,420 | 3/1976 | Görter et al. ......... 152/458 |
| 3,969,568 | 7/1976 | Sperley |
| 4,871,004 | 10/1989 | Brown et al. |
| 4,886,850 | 12/1989 | Ogawa et al. ......... 152/525 |

FOREIGN PATENT DOCUMENTS

| | | |
|---|---|---|
| 2726690 | 12/1977 | Fed. Rep. of Germany ...... 152/211 |
| 9004617 | 5/1990 | PCT Int'l Appl. |
| 1292748 | 10/1972 | United Kingdom |

Primary Examiner—Michael W. Ball
Assistant Examiner—Nancy Krawczyk
Attorney, Agent, or Firm—David E. Wheeler

[57] ABSTRACT

A cut resistant pneumatic tire is provided. The tire has embedded in its sidewalls and/or tread, short lengths of adhesive coated monofilament nylon fibers. Adhesion between the rubber of the tire and the adhesive coated fibers provides a stiffer, more cut resistant composition.

6 Claims, 2 Drawing Sheets

CUT RESISTANT TIRE WITH EMBEDDED OBLONG FIBERS

BACKGROUND OF THE INVENTION

The invention relates to cut resistant pneumatic tires, especially off-the-road tires and heavy duty off-the-road tires.

Heavy duty off-the-road tires, because of the nature of their use, are exposed to cutting and delamination caused by sharp rocks and uneven terrain. In the prior art, this problem was sometimes addressed by including wire fragments embedded in the rubber of the tread and sidewalls of such tires. Although shredded wire works well to prevent cut growth, it may be relatively expensive (brass coated wire works best), and is very difficult to handle and process into rubber. Wire tends to jam the processing equipment and causes accelerated wear of the processing equipment.

It is an object of the present invention to provide a cut resistant tire having at least as good cut resistance properties as wire reinforced tires, which are easier to process and to build than wire reinforced tires.

Other objects of the invention will be apparent from the following specification and claims.

SUMMARY OF THE INVENTION

A cut resistant pneumatic tire is provided which comprises at least a pair of beads, carcass plies comprising parallel cord reinforcement wrapped around the beads, a tread disposed over the carcass plies in a crown area of the tire, and sidewalls disposed over the carcass plies between the tread and the beads. The tread and/or the sidewalls or both has disposed therein about 1-20 phr adhesive coated chopped monofilament, nylon fibers. The nylon fibers used have an oblong cross section 0.51 cm (0.20 inch) 0.127 cm (0.050 inch) inches wide, about 0.017 inches thick and about to 1.27 inches long. In the preferred embodiment, the adhesive causes the nylon fibers to bond to the rubber of the tire. The nylon monofilament used, prior to processing into fiber, has a tenacity of at least 6 g/denier, an initial modulus of at least 30 g/denier and a shrinkage of not greater than 5%.

DETAILED DESCRIPTION OF THE INVENTION

Figure 1:
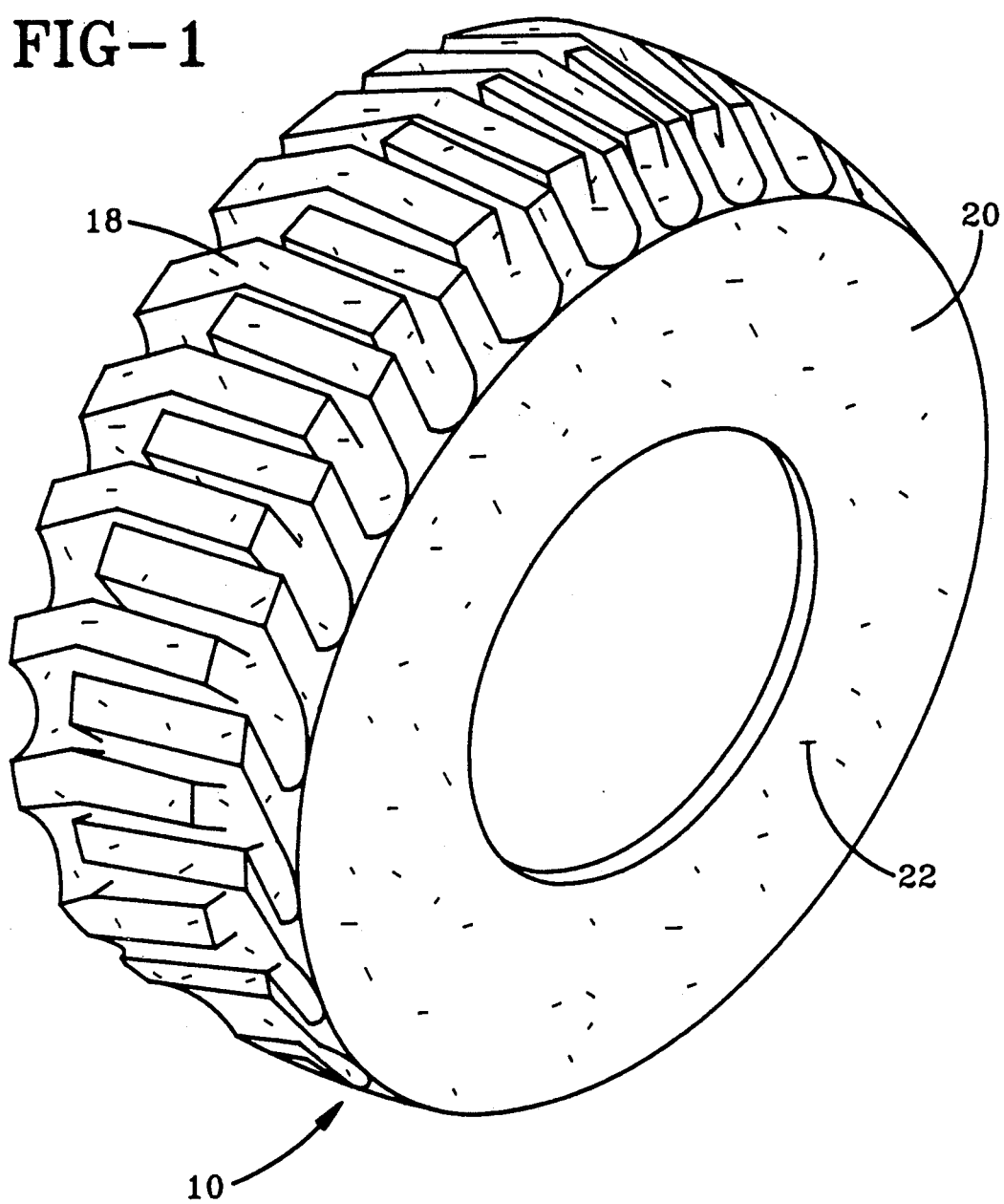
FIG. 1 illustrates a heavy duty off-the-road tire having adhesive coated monofilament nylon fibers dispersed in the tread and sidewalls.
Figure 3:
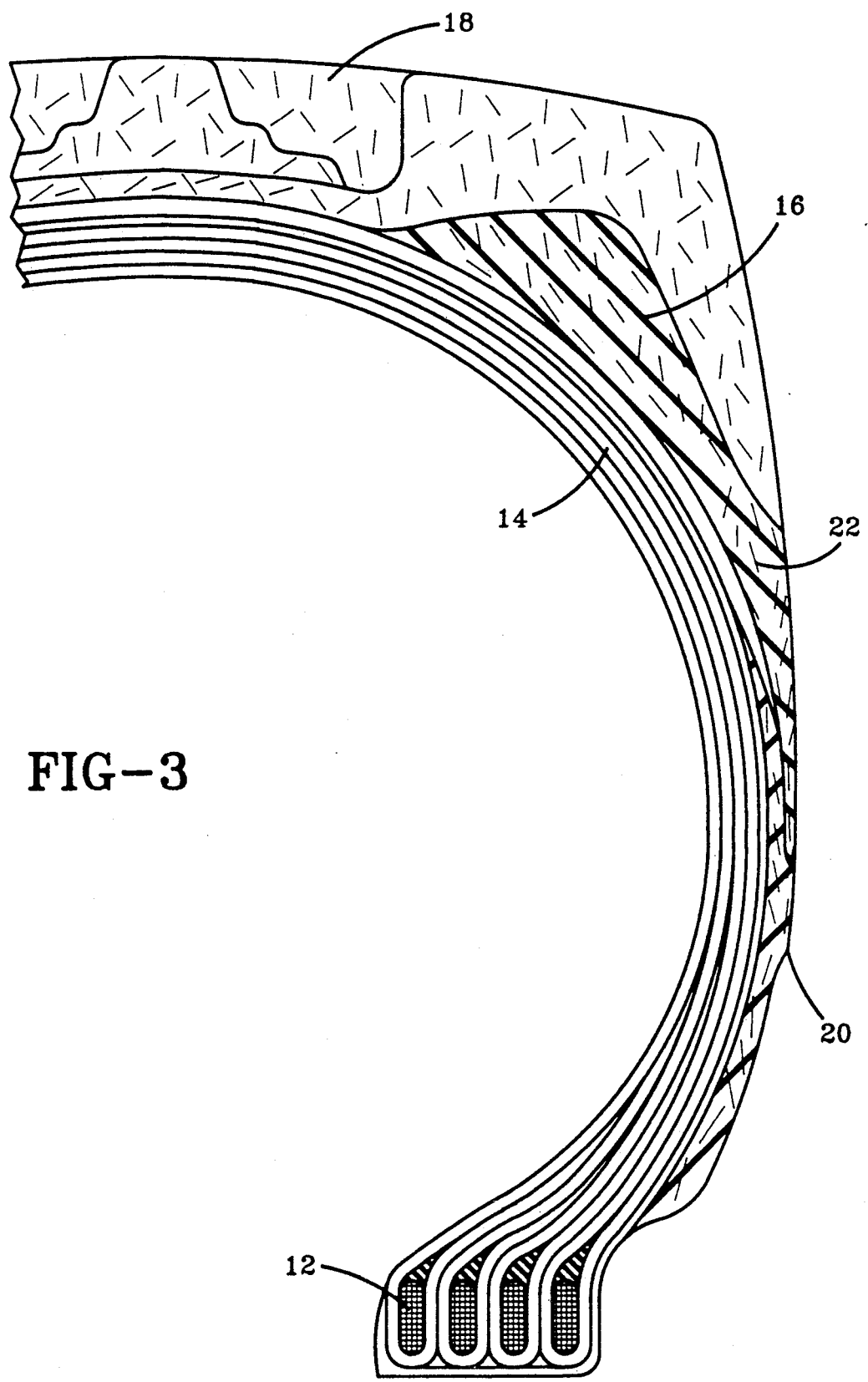
FIG. 3 illustrates a cross section of a heavy duty off-the-road tire having nylon fibers dispersed in the tread, sidewalls and tread base.

With reference now to FIGS. 1 and 3, a heavy duty, off-the-road tire 10 of the invention is illustrated. The tire comprises beads 12, carcass plies 14 wrapped around beads 12, tread base 16 disposed over carcass plies 14 in a crown area of tire 10, tread 18 disposed over tread base 16 and sidewall 20, disposed between the tread and beads 12.

As used herein, when used in a general sense, the term tread includes the tread 18 and tread base 16.

In the illustrated embodiment, fibers 22 are dispersed in the tread 18, tread base 16 and sidewall 20. Those skilled in the art will recognize that, for a given purpose, a tire may be constructed according to the invention having fiber in any one portion, or a combination of two or more of the illustrated portions of the tire.

When employed in tread 18 and sidewall 20, the fibers 22 improve the cut resistance of the tire, and when used in tread base 16, the fibers help prevent delamination of the tire.

It is believed that monofilament fibers demonstrate improved strength over flock fibers or multi-filament fibers because of their integrity, i.e. the fibers will not break up into component parts during processing. It is believed that any high strength or high modulus monofilament fiber, e.g. aramid, polyester, or nylon can be used in the invention.

Figure 2:
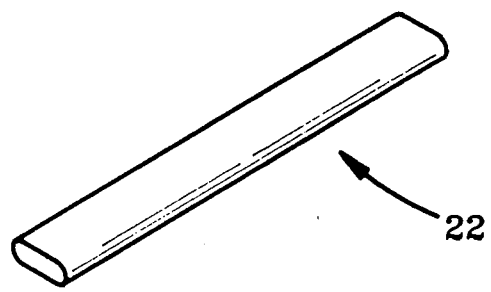
FIG. 2 illustrates oblong monofilament fibers used in the invention.

The fibers used in the invention (illustrated in FIG. 2) are prepared by E. I DuPont Nemours Inc, Wilmington, Delaware by coating an oblong nylon monofilament (Hyten TM, available from DuPont) with an adhesive and chopping the adhesive coated monofilament into short pieces. The fibers of the invention have a length of about (0.254 cm) to 1.27 cm (0.5 cm), preferably 0.508 cm (0.2 cm) to 0.889 cm (0.35 in.), a thickness of about 0.013 cm (0.005 cm) to 0.043 cm (0.017 cm) preferably 0.025 cm (0.01 in.) to 0.036 cm (0.014 in), and a width of 0.051 cm (0.020 in) to 0.127 cm. (0.050 in.), preferably 0.076 cm (0.03 in.) to 0.102 cm (0.04 in.). Prior to processing, the monofilament has a tenacity of at least 6 g/denier, an initial modulus of at least 30 g/denier and a shrinkage of not greater than 5%.

The fibers are coated with adhesive using conventional processing using a single end dip coating and a multi-end (15 to 20 or more ends) chopping process to obtain fiber having the desired length. In the illustrated embodiment, the monofilament used was about 2000 denier and had a tenacity of about 9 g/denier, an initial modulus of about 50 g/denier, an elongation at break of at least 18% and a shrinkage of not greater than 4%.

As is known in the art, RFL (resorcinol, formaldehyde, latex) adhesives provide a means for bonding substances to rubber that do not generally bond well to rubber.

It was theorized according to the present invention that improving the bond between fibers and rubber using an RFL coating on the fibers would improve the stiffness, tear resistance, stone penetration and other properties of the rubber composition.

The RFL solution used for coating the fibers comprised, in general, water, formaldehyde, latex, resorcinol, sodium hydroxide, ammonium hydroxide and RF resin.

The RFL coated fibers were processed into rubber using a Banbury mixer, made by Ferrell Corp, and the consistency and appearance of the fiber loaded rubber was similar to that observed for rubber which is loaded with shredded wire.

When loaded with 1-20 phr fibers, preferably 1-5 phr, it was found that rubber compounds incorporating the adhesive coated fibers demonstrated remarkably improved tear resistance as compared to a control compound prepared without the use of fibers.

Tires of the invention are made as is conventional in the art except that the rubber used to make the tread, tread base, and/or sidewalls is loaded with the adhesive coated fibers described herein instead of shredded wire. It is believed that because of the adhesive coating there is a substantial interaction between the fiber and rubber which is responsible for the improved properties described in the following examples.

Rubber compounds containing adhesive coated chopped monofilament fibers and used in the tire of the invention demonstrated a 300% modulus of about 4-9 MPa, a tensile strength of 5-25 MPa, an elongation of 250-750%, a 100° C. rebound of 30-64, preferably 58-64, and a 100° C. hardness of 48-56. The invention is illustrated further with reference to the following examples.

EXAMPLE 1

Industrial Dip Solutions

This example illustrates standard RFL dip solutions used by DuPont on synthetic fibers. It is believed that the first formulation provided below was used for the RFL coating on the fibers described herein.

In the following formulations, the first number illustrated represents the strength of the composition used in percentage by weight in water, and the second number illustrates the amount of the composition (by weight %) used in the RFL dip formulation.

| | Formaldehyde Dip Solutions |
|---|---|
| 1. | Formaldehyde 37% (2%) |
| | *Gen-Tac 41% (42%) |
| | Resorcinol Flakes (2%) |
| | Sodium Hydroxide 1.67% (3%) |
| | Ammonium Hydroxide 28-30% (2%) |
| | H$_2$O 49% |
| 2. | Formaldehyde 37% (8%) |
| | Gen-Tac 41% (48%) |
| | Resorcinol Flakes (15%) |
| | H$_2$O 29% |
| 3. | Formaldehyde 37% (2%) |
| | Gen-Tac 41% (33%) |
| | **PEXWL Additive 20% (18%) |
| | Resorcinol Flakes (2%) |
| | Sodium Hydroxide 2.86% (7%) |
| | H$_2$O 38% |
| 4. | Formaldehyde 37% (2%) |
| | Gen-Tac 41% (45%) |
| | ***Penacolite R2170 75% (4%) |
| | Ammonium Hydroxide 28-30% (1%) |
| | ****Vulcan 3 (HAF Carbon Black) 25% (11%) |
| | H$_2$O 39% |
| 5. | Formaldehyde 37% (2%) |
| | Gen-Tac 41% (5%) |
| | Penacolite R2170 75% (4%) |
| | Ammonium Hydroxide 28-30% 1% |
| | H$_2$O 43% |

*Gen-Tac is the tradename for SBR latex solution which is available from General Tire.
**PEXWL is a DuPont code name.
***Penacolite R 2170 is an RF resin equivalent to Penasic, available from Goodyear
****Vulcan 3 is a carbon black available from Cabot Corp.

EXAMPLE 2

This example illustrates physical properties observed in sidewall rubber compound when loaded with various amounts of adhesive coated fibers. The adhesive coated fibers used in the compound comprised oblong monofilament nylon (Hyten) approximately 0.089 cm (0.035 in.) wide, 0.028 cm (0.011 in.) thick and 0.635 cm (0.25 in.) long. The fibers had been coated with the RFL adhesive described in Example 1. It is believed that the first formula described in the example was used.

In the formulation described, Nolo is natural rubber, Nadenic is synthetic polybutadiene rubber and 399 is carbon black 399. In addition to the ingredients listed, each compound contained 0.5-1.0 phr vulcanizing agents and 0.5 to 1.5 phr resorcinol resin curing agents, 4-5 phr oils, 1-2 phr accelerators and 2-3 phr antioxidants. Compound 253 is used as the control.

In the ATS aging test, samples of the rubber composition were tested after vulcanization, and again after 14 days in an oven at 70° C.

| SUBJ: DIPPED CHOPPED HYTEN LAB EVALUATION OTR TIRE CMPDS | | | | | |
|---|---|---|---|---|---|
| Compound No. | 253 | 254 | 255 | 256 | 257 |
| Nolo (phr) | 50 | 50 | 50 | 50 | 50 |
| Nadenic (phr) | 50 | 50 | 50 | 50 | 50 |
| 399 | 45 | 45 | 45 | 42.5 | 42.5 |
| (Chopped Hyten (phr) | — | 2 | 4 | 4 | 2 |
| ATS | | | Reg/Aged | | |
| 140/135 | 253 | 254 | 255 | 256 | 257 |
| 300% Mod | 5.5/8.0 | 5.0/7.8 | 5.0/7.6 | 4.5/ | 5.0/ |
| Ten | 19.6/18.8 | 8.2/8.0 | 7.2/7.8 | 6.5/5.8 | 9.0/6.4 |
| Elong | 670/575 | 400/325 | 375/310 | 370/275 | 450/295 |
| Reb @ 100C | 60/60 | 61.5/60.0 | 61/60 | 62/60 | 62/61 |
| Hard @ 100C | 52/54 | 50.5/53 | 52/53.5 | 50/53 | 51/52 |
| Sp Gr | 1.097 | 1.094 | 1.096 | 1.088 | 1.090 |
| Zwick Reb Aged | 56.4 | 56.8 | 56.4 | 57.6 | 58.2 |
| Dispersion | 68 | 68 | 50 | 50 | 50 |
| *Bdgstne Pent | 576 | 578 | 575 | 563 | 580 |

Rheometer data, not shown, has demonstrated that the cure rate of the fiber loaded compound is not changed as compared to the control.

In the Hot Flex test, a strip sample of rubber is penetrated with a pin, subjected to mechanical flexing for a set period of time, and the size of any crack propagating from the pin hole is measured.

| PD100C | 253 | 254 | 255 | 256 | 257 |
|---|---|---|---|---|---|
| Hot PG Flex | | | Reg/Aged | | |
| 5' | 1/1 | 1/1 | 1/1 | 1/1 | 1/1 |
| 30 | 1/1 | 1/2 | 1/1 | 1/1 | 1/1 |
| 120 | 1/3 | 3/4 | 2/1 | 2/8 | 1/2 |
| 180 | 2/7 | 3/4 | 2/1 | 2/8 | 2/2 |
| 240 | 3/8 | 4/4 | 3/1 | 3/8 | 3/2 |

In the Instron tear test, a sample of rubber is cut and then stretched to break.

The force at break in Newtons (N) is measured.

| | Reg/Aged | | | | |
|---|---|---|---|---|---|
| **Inst Tear | | | | | |
| IntgAvg | 2075/2050 | 3124/2056 | 3661/1777 | 2954/1913 | 2478/1846 |
| PkAvg | 293/314 | 367/338 | 364/329 | 346/330 | 327/314 |
| ***Din Abr | | | | | |
| Vol Loss | | | | | |

-continued

| | Reg/Aged | | | | |
|---|---|---|---|---|---|
| Wt Loss | 74 | 77 | 76 | 79 | 81 |

In the Stebler adhesion test, two or more strips of rubber are laminated and the force needed to separate them is measured. In this test, the adhesion of the sidewall rubber was measured when a strip of the rubber was laminated with itself (the same rubber composition), as well as with conventional base rubber, bias ply rubber, and radial ply rubber. The subscript numbers are a subjective indication of the roughness of the rubber surface of the lamination, 1 being the best and 4 being relatively smooth. A rough surface indicates tearing between the laminate layers which suggests a higher adhesion between the layers than rubber strength in the layers.

| ****Steb Adh | 253 | 254 | 255 | 256 | 257 |
|---|---|---|---|---|---|
| self | 144/177 | 142/167 | 145/178 | 150/177 | 148/166 |
| Base | 94/115$_2$ | 94/118$_2$ | 97/117 | 85/102$_2$ | 93/113$_2$ |
| Bias | 85/104$_{2-3}$ | 77/92$_{2-3}$ | 78/97$_2$ | 75/90$_2$ | 85/102$_2$ |
| Radial | 53/62$_3$ | 52/63$_{2-3}$ | 50/65$_{2-3}$ | 58/64$_3$ | 59/70$_{2-3}$ |

-continued

| Steb Adh | Aged 14 days oven @ 70° C. | | | | |
|---|---|---|---|---|---|
| self | 95/115$_1$ | 107/133 | 101/119 | 92/107 | 101/121 |
| Base | 65/78$_2$ | 62/—$_2$ | 67/78 | 60/71$_2$ | 55/67$_{2-3}$ |
| Bias | 63/74$_{2-3}$ | 63$_{2-3}$ | 61/71$_{2-3}$ | 58/71$_{2-3}$ | 60/70$_{2-3}$ |
| Radial | 30/—$_{4-5}$ | 23/—$_{4-5}$ | 29/41$_4$ | 25/—$_4$ | 21/—$_{4-5}$ |

*Bridgestone Penetration Test
**Instron Tear Test
***Din Abrasion Test
****Stebler Adhesion Test Tests for the sidewall rubber demonstrate improved tear and flexing resistance properties when the fiber is loaded with adhesive coated fibers. Other demonstrated properties were at least as good as the control. Compound 255 demonstrated the best overall results. Similar tests were run on tread compounds (base and cap) as illustrated below. The compounds described below, in addition to the ingredients described, contained 0.5–1.0 phr vulcanizing agents, 4–5 phr oils, 1–2 phr accelerators, and 2–3 phr antioxidants.

| SUBJECT: DIPPED CHOPPED HYTEN LAB EVALUATION OTR TREAD CMPDS | | | | | | | | |
|---|---|---|---|---|---|---|---|---|
| | 1. Base Compound | | | | 2. *Cap Compound | | | |
| | 792 Control | 793 | 794 | 795 | 796 Control | 797 | 798 | 799 |
| Nolo (phr) | 100 | 100 | 100 | 100 | 100 | 100 | 100 | 100 |
| CB 599 (phr) | 30 | 30 | 30 | 27.5 | — | — | — | — |
| CB 405 (phr) | — | — | — | — | 45 | 45 | 45 | 42.5 |
| Hysil 571 (phr) | 20 | 20 | 20 | 18.5 | 15 | 15 | 15 | 12.5 |
| (Chopped Hyten ATS 140/135 | — | 2 | 4 | 4 | — | 2 | 4 | 4 |
| | UTS/ATS Results aged 14 days oven @ 70° C. | | | | | | | |
| 300% Mod | 9.2/13.6 | 9.1/— | 9.5/— | —/— | 9.0/13.2 | 9.0/— | 9.5/— | 8.0/— |
| Ten | 26.2/20.5 | 10.8/11.6 | 10.5/8.9 | 8/9.0 | 22.8/16.2 | 10.5/9.4 | 10.2/8.2 | 9.0/8.4 |
| Elong | 600/451 | 335/290 | 300/245 | 280/247 | 580/394 | 330/257 | 320/222 | 320/250 |
| Reb @ 100° C. | 68 | 68.5 | 69.3 | 72.2 | 55.5 | 57 | 56 | 60.2 |
| Aged | 70 | 71 | 71 | 70 | 55 | 55 | 55 | 57 |
| Hard @ 100° C. | 55 | 55 | 55 | 54 | 55 | 54 | 56 | 54.7 |
| Sp Gr | 1.117 | 1.123 | 1.119 | 1.109 | 1.137 | 1.138 | 1.138 | 1.126 |
| Zwick Reb | Aged Results 14 days oven @ 70° C. | | | | | | | |
| | 69.2 | 66.2 | 66.4 | 69.4 | 50.2 | 49.6 | 49.0 | 51.2 |
| Dispersion | 80 | 60 | 60 | 60 | 75 | 55 | 60 | 55 |
| Bdgstne Pent | 543 | 529 | 533 | 542 | 478 | 481 | 475 | 480 |

| PD100C | 792 Control | 793 2 phr | 794 4 phr | 795 4 phr lo blk HISIL | 796 Control | 797 | 798 | 799 4 phr lo blk HISIL |
|---|---|---|---|---|---|---|---|---|
| Hot PG Flex | Reg Aged | | | | | | | |
| 5' | 2/3 | 2/2 | 2/3 | 3/3 | 2/2 | 2/1 | 2/2 | 3/2 |
| 30 | 2/9 | 2/8 | 2/9 | 8/20 | 2/5 | 2/1 | 2/5 | 3/3 |
| 60 | 3/17 | 2/14 | 4/13 | 13/36 | 2/7 | 2/1 | 2/6 | 3/3 |
| 120 | 5/28 | 3/17 | 11/22 | 24/0 | 2/8 | 2/2 | 2/6 | 6/3 |
| 180 | 11/39 | 4/20 | 14/28 | 30/— | 2/8 | 2/2 | 2/26 | 6/5 |
| 240 | 15/— | 4/26 | 16/32 | 37/— | 2/8 | 2/2 | 2/28 | 7/6 |
| Inst Tear | Reg Aged | | | | | | | |
| Intg Avg | 1665/1457 | 1573/1594 | 1508/1319 | 1551/1403 | 1924/1782 | 1978/1776 | 1542/1572 | 2205/2198 |
| Pk Avg | 315/324 | 335/353 | 327/336 | 342/328 | 382/420 | 394/366 | 374/380 | 415/434 |
| Din Abr | | | | | | | | |
| Vol Loss | 147 | 144 | 137 | 134 | 178 | 181 | 169 | 165 |
| Wt Loss | — | 149 | 143 | 137 | 186 | 187 | 176 | 169 |
| Steb Adh | | | | | | | | |
| self | 130/157$_1$ | 141/165$_1$ | 129/158$_1$ | 94/109$_1$ | 238/285$_1$ | 247/293$_1$ | 240/298$_1$ | 231/279$_1$ |
| TA076 | 116/144$_1$ | 134/161$_1$ | 122/144$_1$ | 114/137$_1$ | 102/119$_1$ | 103/118$_1$ | 121/143$_1$ | 114/132$_1$ |
| GB018 | 110/134$_1$ | 115/136$_1$ | 96/114$_1$ | 101/120$_1$ | 95/113$_1$ | 89/105$_1$ | 96/116$_1$ | 87/108$_1$ |
| GB135 | 83/101$_1$ | 89/106$_1$ | 68/79$_{1-2}$ | 83/96$_1$ | 123/146$_1$ | 124/145$_1$ | 123/133$_1$ | 128/150$_1$ |
| TA334 | 53/63$_2$ | 61/72$_2$ | 61/73$_2$ | 62/72$_2$ | 52/62$_2$ | 55/65$_2$ | 53/64$_2$ | 58/69$_2$ |

-continued

| Steb Adh | Aged 14 days oven @ 70° C. | | | | | | | |
|---|---|---|---|---|---|---|---|---|
| self | 89/98$_1$ | 119/151 | 91/105 | 78/97 | 163/188 | 158/159 | 148/178 | 160/198 |
| TA076 | 95/111$_1$ | 84/99 | 92/111 | 79/93 | 58/64$_2$ | 69/80$_2$ | 58/67$_2$ | 58/60$_3$ |
| GB018 | 66/79$_2$ | 61/74 | 69/85 | 68/82 | 32/40$_3$ | 45/55$_{2-3}$ | 45/55$_{2-3}$ | 39/52$_3$ |
| GB135 | 55/64$_{1-2}$ | 61/76$_{1-2}$ | 40/56$_2$ | 57/70$_2$ | 51/59$_2$ | 38/53$_3$ | 50/62$_{2-3}$ | 57/70$_2$ |
| TA334 | 35/42$_{3-4}$ | 37/44$_{3-4}$ | 39/48$_3$ | 37/43$_{3-4}$ | 20/25$_4$ | 22/29$_4$ | 14/21$_4$ | 18/24$_4$ |

From the above data it can be again concluded that the fiber loaded compounds demonstrate superior tear resistance, adhesion and rebound properties.

The base compound 794 and cap compound 799 were shown to have the best overall properties.

While specific embodiments of the invention have been illustrated and described, it will be recognized by those skilled in the art that the invention can be variously modified and practiced without departing from the spirit of the invention. The invention is limited only by the following claims.

What is claimed is:

1. A cut resistant heavy duty off the road pneumatic tire which comprises at least a pair of annular beads, carcass plies containing parallel cord reinforcement wrapped around said beads, a tread disposed in a crown area of said tire over said carcass plies, and sidewalls disposed over said carcass plies between said tread and said beads, wherein said tread has disposed therein 1-20 phr chopped adhesive coated indivisible monofilament organic fibers, wherein said fibers have an oblong cross section about 0.051 cm (0.020 in.) to 0.127 cm (0.050 in.) wide, a thickness of about 0.013 cm (0.005 in.) to 0.043 cm (0.017 in.) and a length of about 0.254 cm (0.1 in.) to 1.27 cm (0.5 in.), and a tenacity of at least 6 g/denier, an initial modulus of at least 30 g/denier and a shrinkage of not greater than 5%, and wherein rubber compounds reinforced with adhesive coated chopped monofilament fibers used in said tire have a 300% modulus of about 4-9 MPa, a tensile strength of 5 to 25 MPa, an elongation of 250-750%, a 100° C. rebound of 58-64, and a 100° C. hardness of 48-56.

2. The pneumatic tire of claim 1 wherein said adhesive is an RFL adhesive.

3. The pneumatic tire of claim 1 wherein said monofilament used to make said fibers are about 2000 denier and have a tenacity of about 9 g/denier, an initial modulus of about 50 g/denier, an elongation at break of at least 18% and a shrinkage of not greater than 4%.

4. A cut resistant off the road heavy duty pneumatic tire which comprises at least a pair of annular beads, carcass plies containing parallel cord reinforcement wrapped around said beads, a tread disposed in a crown area of said tire over said carcass plies, and sidewalls disposed over said carcass plies between said tread and said beads, wherein said tread and sidewalls have disposed therein 1-20 phr chopped adhesive coated indivisible high modulus monofilament nylon fibers, wherein said fibers have an oblong cross section about 0.051 cm to 0.127 cm (0.020 to 0.050 inches) wide, about 0.013 cm to 0.043 cm (0.005 to 0.017 inches) thick and about 0.254 cm to 1.27 cm (0.1 to 0.5 inches) long and wherein said monofilament used to make said nylon fibers has a tenacity of at least 6 g/denier, an initial modulus of at least 30 g/denier and a shrinkage of not greater than 5%.

5. The tire of claim 1 in which said fibers are disposed in the sidewalls of said tire.

6. A cut resistant heavy duty off the road pneumatic tire which comprises at least a pair of annular beads, carcass plies containing parallel cord reinforcement wrapped around said beads, a tread disposed in a crown area of said tire over said carcass plies, and sidewalls disposed over said carcass plies between said tread and said beads, wherein said sidewalls have disposed therein 1-20 phr chopped adhesive coated indivisible monofilament organic fibers, wherein said fibers have an oblong cross section about 0.051 cm (0.020 in.) to 0.127 cm (0.050 in.) wide, a thickness of about 0.013 cm (0.005 in.) to 0.043 cm (0.017 in.) and a length of about 0.254 cm (0.1 in.) to 1.27 cm (0.5 in), and a tenacity of at least 6 g/denier, an initial modulus of at least 30 g/denier and a shrinkage of not greater than 5%, and wherein rubber compounds reinforced with adhesive coated chopped monofilament fibers used in said tire have a 300% modulus of about 4-9 MPa, a tensile strength of 5 to 25 MPa, an elongation of 250-750%, a 100° C. rebound of 58-64, and a 100° C. hardness of 48-56.

* * * * *